(12) United States Patent
Iseki et al.

(10) Patent No.: US 7,485,687 B2
(45) Date of Patent: Feb. 3, 2009

(54) ETHYLENE-α-OLEFIN COPOLYMER, MOLDING THEREOF AND PROCESS FOR PRODUCING THE COPOLYMER

(75) Inventors: Yuki Iseki, Scarsdale, NY (US); Tomoaki Goto, Sodegaura (JP); Yasutoyo Kawashima, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/528,444

(22) Filed: Sep. 28, 2006

(65) Prior Publication Data

US 2007/0100105 A1 May 3, 2007

(30) Foreign Application Priority Data

Sep. 30, 2005 (JP) ............................. 2005-286840

(51) Int. Cl.
*C08F 4/42* (2006.01)

(52) U.S. Cl. .................... 526/160; 526/348; 526/348.6; 526/943; 526/129

(58) Field of Classification Search ............. 526/348.6, 526/348, 160, 943, 129
See application file for complete search history.

(56) References Cited

U.S. PATENT DOCUMENTS

2004/0030082 A1* 2/2004 Iseki ....................... 526/348.2

* cited by examiner

*Primary Examiner*—Ling-Siu Choi
(74) *Attorney, Agent, or Firm*—Birch, Stewart, Kolasch & Birch, LLP

(57) ABSTRACT

An ethylene-α-olefin copolymer containing monomer units derived from ethylene and monomer units of an α-olefin having 3 to 20 carbon atoms and having a melt flow rate of from 0.01 to 100 g/10 min, an activation energy of flow of 50 kJ/mol or more, a molecular weight distribution measured by a gel permeation chromatography of 3 or more and minute defects of 2000/m$^2$ or less in number, a process for producing the copolymer, and a molding of the copolymer.

4 Claims, No Drawings

ETHYLENE-α-OLEFIN COPOLYMER, MOLDING THEREOF AND PROCESS FOR PRODUCING THE COPOLYMER

BACKGROUND OF THE INVENTION

1. Field of the Invention

The present invention relates to an ethylene-α-olefin copolymer, a molding of the copolymer and a process for producing the copolymer.

2. Description of the Related Arts

A molding formed by extrusion molding of an ethylene-α-olefin copolymer is used quite often as a film or sheet in packaging of foods, pharmaceuticals and sundry goods. An ethylene-α-olefin copolymer used in this application requires good moldability such as low extrusion load and process stability. For example, it has been proposed to copolymerize ethylene with 1-butene with a catalyst prepared by adding a catalyst component prepared by adding an organic aluminoxy compound after addition of triisobutylaluminum to silica, and next, reacting bis(indenyl)ethane, n-butyllithium and zirconium tetrachloride, to obtain an ethylene-α-olefin copolymer (e.g. JP04-213309A). However, a molding formed from the above ethylene-α-olefin copolymer showed poor appearance due to glaring and was not fully satisfied.

SUMMARY OF THE INVENTION

An object of the present invention is to provide an ethylene-α-olefin copolymer having a good moldability and giving a molding with less flickering, a molding of the copolymer and a process for producing the copolymer.

That is, a first aspect the present invention relates to an ethylene-α-olefin copolymer having monomer units derived from ethylene, monomer units derived from an α-olefin having 3 to 20 carbon atoms, a melt flow rate (MFR) of from 0.01 to 100 g/10 min, an activation energy of flow (Ea) of 50 kJ/mole or more, a molecular weight distribution (Mw/Mn) measured by a gel permeation chromatography of 3 or more and minute defects of 2000/m$^2$ or less in number.

A second aspect of the present invention relates to a molding of the above ethylene-α-olefin copolymer.

A third aspect of the present inventions relates to a process for producing an ethylene-α-olefin copolymer which comprises copolymerizing ethylene with an α-olefin having 3 to 20 carbon atoms in the presence of a prepolymerized solid catalyst, wherein the prepolymerized solid catalyst is prepared by prepolymerizing an olefin in the presence of a contact-treated product prepared by contact-treating a contact-treated component of the following component (A) with the following component (B), with the following component (C), 0.1 to 5 g per 1 g of the (A) of the prepolymer having an intrinsic viscosity of 2 to 4 dl/g is produced from the initiation of the prepolymerization, a content of the prepolymer in the prepolymerized solid catalyst is 0.1 to 500 g per 1 g of the (A) and a heat quantity of crystal fusion is 160 J/g or more.

Component (A): a solid co-catalyst component prepared by supporting a compound forming an ionic complex by ionization of a metallocene complex on fine particle-like support, Component (B): the metallocene complex, and Component (C): an alkylating agent

DETAILED DESCRIPTION OF THE INVENTION

An ethylene-α-olefin copolymer of the present invention is an ethylene-α-olefin copolymer containing monomer units derived from ethylene and monomer units derived from the α-olefin having 3 to 20 carbon atoms. Examples of the α-olefin include propylene, 1-butene, 1-pentene, 1-hexene, 1-heptene, 1-octene, 1-nonene, 1-decene, 1-dodecene, 4-methyl-1-pentene and 4-methyl-1-hexene. These may be used singly or in combination of two or more kinds. The α-olefin is preferably 1-hexene and 4-methyl-1-pentene.

A content of the monomer unit derived from ethylene in the ethylene-α-olefin copolymer is usually from 50 to 99.5% by weight based on the total weight (100% by weight) of the ethylene-α-olefin copolymer. A content of the monomer unit based on an α-olefin is usually from 0.5 to 50% by weight based on the total weight (100% by weight) of the ethylene-α-olefin copolymer.

In addition to monomer units derived from ethylene and the α-olefin mentioned above, the ethylene-α-olefin copolymer of the present invention may contain a monomer unit derived from another monomer as far as the effect of the present invention is not impaired. Examples of the monomer include, for example, a conjugated diene (e.g. butadiene and isoprene), non-conjugated diene (e.g. 1,4-pentadiene), acrylic acid, an acrylic acid ester (e.g. methyl acrylate and ethyl acrylate), methacrylic acid, a methacrylic acid ester (e.g. methyl methacrylate and ethyl methacrylate) and vinyl acetate.

The ethylene-α-olefin copolymer of the present invention is preferably a copolymer containing monomer units derived from ethylene and monomer units derived from an α-olefin having 4 to 20 carbon atoms, more preferably 5 to 20 carbon atoms, further preferably 6 to 20 carbon atoms.

Examples of the ethylene-α-olefin copolymer include an ethylene-1-hexene copolymer, an ethylene-4-methyl-1-pentene copolymer, an ethylene-1-octene copolymer, an ethylene-1-1-butene-hexene copolymer, an ethylene-1-butene-4-methyl-1-pentene copolymer and an ethylene-1-butene-1-octene copolymer, preferably an ethylene-1-hexene copolymer, an ethylene-4-methyl-1-penetene copolymer, an ethylene-1-butene-1-hexene copolymer and an ethylene-1-butene-4-methyl-1-pentene copolymer and more preferably an ethylene-1-hexene copolymer and an ethylene-1-butene-1-hexene copolymer.

A melt flow rate (MFR; unit, g/10 minutes) of the ethylene-α-olefin copolymer of the present invention is usually from 0.01 to 100 g/10 minutes. The melt flow rate is preferably 0.05 g/10 minutes or more and more preferably 0.1 g/10 minutes or more from the viewpoint of enhancement of moldability, particularly reducing extrusion load. Further, from the view point of enhancement of melt tension and mechanical strength of moldings obtained, the melt flow rate is preferably 20 g/10 minutes or less, more preferably 10 g/10 minutes or less and most preferably 6 g/10 minutes or less. The melt flow rate is a value measured with the A method at temperature of 190° C. under a load of 21.18N in a method defined by JIS K7210-1995. In measurement of the melt flow rate, the ethylene-α-olefin copolymer formulated with about 1000 ppm of an antioxidant in advance is usually used.

A density (d; unit, kg/m$^3$) of the ethylene-α-olefin copolymer of the present invention is usually from 890 to 970 kg/m$^3$, preferably 900 kg/m$^3$ or more, more preferably 905 kg/m$^3$ or more and most preferably 910 kg/m$^3$ or more from the viewpoint of improving rigidity of moldings obtained and preferably 940 kg/m$^3$ or less and more preferably 930 kg/m$^3$ or less from the viewpoint of improving impact strength of the moldings obtained. The density is measured by a method defined in A method of JIS K7112-1980 after annealed according to JIS K6760-1995.

The ethylene-α-olefin copolymer is an ethylene-α-olefin copolymer having long chain branches and being superior in moldability, and such ethylene-α-olefin copolymer has a higher activation energy of flow (Ea; unit is kJ/mol) than conventionally known linear ethylene-α-olefin copolymers. The conventionally known linear ethylene-α-olefin copolymers have an Ea value of lower than 50 kJ/mol, thereby sometimes to have disadvantages such as unsatisfied moldability, especially in an extrusion load.

Ea of the ethylene-α-olefin copolymer of the present invention is preferably 55 kJ/mole or more and more preferably 60 kJ/mole or more from the viewpoint of improving moldability, particularly lowering extrusion load without excessively reducing a melt tension. Ea is preferably 100 kJ/mole or less and more preferably 90 kJ/mole or less from the viewpoint of enhancing gloss of a molding.

The activation energy of flow (Ea) is a value calculated according to the Arrhenius equation with a shift factor ($a_T$), the shift factor ($a_T$) being defined while preparing a master curve of melt complex viscosity (unit is Pa·sec) at 190° C. depending on angular frequency (unit is rad/sec) according to the time-temperature superposition principle, and the value of Ea is determined by the following procedure.

Preparing melt complex viscosity-angular frequency curves (melt complex viscosity is expressed in Pa·sec, angular frequency is expressed in rad/sec) of an ethylene-α-olefin copolymer at temperatures (T, expressed in ° C.) of 130° C., 150° C., 170° C., and 190° C. respectively, shifting the melt complex viscosity-angular frequency curves obtained at respective temperatures (T) to respectively superpose on the melt complex viscosity-angular frequency curve of the ethylene-based copolymer at 190° C. according to the time-temperature superposition principle, thus obtaining the shift factors ($a_T$) at the respective temperatures which represent an extent of shifting each curve for the above superposition, calculating a value of $[\ln(a_T)]$ with the shift factors ($a_T$) at the respective temperatures and that of $[1/(T+273.16)]$ with the respective temperatures; and then determining a linear approximation equation (the formula (I) represented below) correlating the above calculated values according to the least-squares method; thereafter, Ea is determined by combining a value of slope m of the linear approximation equation and the formula (II) represented below:

$$\ln(a_T)=m(1/(T+273.16))+n \quad (I),$$

$$Ea=|0.008314 \times m| \quad (II),$$

$a_T$: Shift factor,

Ea: Activation energy of flow (expressed in kJ/mol),

T: Temperature (expressed in ° C.).

The above calculation may be carried out with using a commercially available calculation software, which includes Rhios V.4.4.4 manufactured by Rheometrics.

The shift factor ($a_T$) represents the extent of shifting each of the melt complex viscosity-angular frequency curves obtained at respective temperatures, wherein each of the curves plotted on a double logarithmic chart is shifted in the direction of $\log(Y)=-\log(X)$ (wherein y-axis represents melt complex viscosity and x-axis represents angular frequency) to superpose on the melt complex viscosity-angular frequency curve at 190° C., and each of the double logarithmic melt complex viscosity-angular frequency curves is superposed by shifting in amounts of $a_T$ times angular frequency and $1/a_T$ times melt complex viscosity. For determining the formula (I) depending on the values obtained at 130° C., 150° C., 170° C., and 190° C. according to the least-squares method, a value of 0.99 or more is usually employed as a correlation coefficient.

The melt complex viscosity-angular frequency curve is measured with a viscoelasticity meter (for example, Rheometrics Mechanical Spectrometer RMS-800, manufactured by Rheometrics, and the like) usually under the conditions of a geometry with parallel plate, a plate diameter with 25 mm, a plate clearance with 1.5 to 2 mm, a strain with 5%, and an angular frequency with 0.1 to 100 rad/sec. The measurement is carried out under a nitrogen atmosphere, and a sample for measurement may be blended in advance with an appropriate amount of antioxidant (for example, 1000 ppm).

The molecular weight distribution (Mw/Mn) of the ethylene-α-olefin copolymer, in view of enhancing moldability, especially in view of lowering extrusion load, is preferably 3 or more, more preferably 5 or more, and even more preferably 6 or more; and in view of enhancing mechanical strength of moldings, being preferably 25 or less, more preferably 20 or less, and even more preferably 15 or less. The molecular weight distribution (Mw/Mn) is a value of Mw divided by Mn, wherein the weight average molecular weight (Mw) and the number average molecular weight (Mn) are measured by a gel permeation chromatography (GPC). Conditions for GPC measurement are exemplified as follows:

(1) Apparatus: Waters 150C manufactured by Water, Inc.
(2) Separation column: TOSOH TSKgelGMH6-HT
(3) Measurement temperature: 140° C.
(4) Carrier: ortho-dichlorobenzene
(5) Flow rate: 1.0 mL/minute
(6) Injected volume: 500 μL
(7) Detector: Differential refractometer
(8) Standard substance for molecular weight: Standard polystyrene The ethylene-α-olefin copolymer of the present invention is a copolymer, in which the number of minute defects (unit, number/$m^2$) in a blown film having a thickness of 30 μm is not more than 2000/$m^2$. When the number is too many, a flicker of a molding sometimes increases.

The number of minute defects is preferably not more than 1500/$m^2$ and more preferably not more than 1000/$m^2$. When the ethylene-α-olefin copolymer is a polymer obtained by copolymerizing ethylene with an α-olefin with a solid catalyst component prepared by supporting a catalyst component on a fine particle-like support, generation of the minute defects is mainly caused to the crushed fragments of the fine particle-like support, and it is considered that the number of the minute defects can be reduced if the fine particle-like support is crushed during prepolymerization to sufficiently very fine particles.

The number of minute defects is a value, where the ethylene-α-olefin copolymer of the present invention is extruded to a blown film having a thickness of 30 μm, of which the number of dark defects with a size from 75 μm×70 μm to 225 μm×214 μm in a film is counted to determine the number of the dark defects per a unit area (1 $m^2$) of the film. The blown film is extruded with a blown film forming machine (full flight type single screw extruder (diameter, 40 mm and L/D=26)) equipped with a circular die having a diameter of 75 mm, under a condition, in which a lip gap is 1 mm, an extrusion temperature is 170° C., a blow up ratio is 1.8 and a throughput is 12.5 kg/hr. The number of dark defects is measured with a digital defect inspection apparatus (for example, GX70LT from Mamiya OP Co., Ltd.) under, for example, the following conditions.

(1) Detection threshold value: 30 or more
(2) Threshold value of detection setting: 24 or more (3) Gain in light source: 1.0

(4) Readout speed: 30 m/min.

(5) Lower limit of detectable size: four pixels in vertical and two pixels in horizontal (6) Average transmitted light intensity: 100

A melt flow rate ratio (MFRR) of the ethylene-α-olefin copolymer of the present invention is, from the viewpoint of improvement of moldability, particularly reduction of extrusion load, preferably 60 or more. Further, the MFRR is usually 210 or less, preferably 190 or less from the viewpoint of heightening strength of molded articles, more preferably 170 or less. The MFRR is a value obtained by dividing a melt flow rate value measured at 190° C. under a load of 211.82 N (21.60 kg) (MFR-H, unit: g/10 minute) according to JIS K7210-1995 by an MFR measured at 190° C. under a load of 21.18 N (2.16 kg) according to JIS K7210-1995. For the above-mentioned melt flow rate measurement, a polymer to which about 1000 wt-ppm of an antioxidant has been previously added is usually used.

As a process for producing the ethylene-α-olefin copolymer of the present invention, preferably, there is exemplified a method of copolymerizing ethylene with the α-olefin using a solid catalyst component prepared by supporting a catalyst component on a fine particle-like support. For example, when a metallocene complex is used as the catalyst component, a method of copolymerizing ethylene with the α-olefin using a solid catalyst component prepared by supporting a compound (hereinafter, referred to as "co-catalyst component (I)") which can form an ionic complex by ionizing the metallocene complex, on the fine particle-like support. The co-catalyst component (I) includes, for example, a boron compound, a zinc compound and an organic aluminoxy compound.

Examples of the boron compound as the co-catalyst component (I) include tris(pentafluorophenyl)borane, triphenylcarbenium tetrakis(pentafluorophenyl)borate, tri(n-butyl) ammonium tetrakis(pentafluorophenyl)borate and N,N-dimethylanilinium tetrakis(pentafluorophenyl)borate.

The zinc compound as the co-catalyst component (I) includes a contact-treated product obtained by subjecting diethyl zinc, a fluorinated phenol and water to contact treatment, and the like.

The organic aluminoxy compound as the co-catalyst component (I) does not include an organic aluminoxy compound containing a small amount of an organoaluminum compound previously handled as an organic aluminoxy compound, but contains a so-called dry organic aluminoxy compound which does not substantially contain the organoaluminum compound, for example, dry methylaluminoxane and dry methylisobutylaluminoxane.

A method of preparing the dry organic aluminoxy compound includes, for example, a method described in JP 2003-128718 A, a method in which a commercially available organic aluminoxy compound is dried under vacuum, a method in which the solid obtained under vacuum is washed with a hydrocarbon solvent.

The boron compound or zinc compound is preferred as the co-catalyst component (I).

As the fine particle-like support, a porous material is preferable, and inorganic oxides such as $SiO_2$, $Al_2O_3$, $MgO$, $ZrO_2$, $TiO_2$, $B_2O_3$, $CaO$, $ZnO$, $BaO$, and $ThO_2$; clays and clay minerals such as smectite, montmorillonite, hectorite, laponite and saponite; and organic polymers such as polyethylene, polypropylene and styrene-divinylbenzene copolymer are used.

A 50% volume-average particle diameter of the fine particle-like support is usually 10 to 500 μm, the 50% volume-average particle diameter is measured by a light scattering type laser diffraction method.

Further, a micro porous volume of the fine particle-like support is usually 0.3 to 10 ml/g and a specific surface area of the fine particle-like support is usually 10 to 1000 $m^2$/g. The micro porous volume and the specific surface area of the fine particle-like support are mainly measured by a gas adsorption method. The micro porous volume is usually analyzed by BJH method and the specific surface area is usually analyzed by BET method.

The above metallocene complex is preferably a transition metal compound given by a following general formula [1] or a dimmer of μ-oxo type transition compound thereof.

$$L^2{}_a M^2 X^1{}_b \qquad [1]$$

(wherein the formula, $M^2$ is a transition metal atom of group 3 to 11 or the lanthanide series in a periodic table. $L^2$ is a group having a cyclopentadiene type anion skeleton and a plural number of $L^2$ may be bonded directly or via a residue containing a carbon, silicon, nitrogen, oxygen, sulfur or phosphorous atom. $X^1$ is a halogen atom, a hydrocarbon group (excluding the cyclopentadiene type anion skeleton) or a hydrocarbon oxy group. a is a number to meet the condition of $0 < a \leq 8$ and b is a number to meet the condition of $0 < b \leq 8$.)

In the general formula [1], $M^2$ is a transition metal atom of the group 3 to 11 or the lanthanide series in a periodic table (IUPAC, 1989). Examples of $M^2$ includes a scandium atom, an yttrium atom, a titanium atom, a zirconium atom, a hafnium atom, a vanadium atom, a niobium atom, a tantalum atom, a chromium atom, an iron atom, a ruthenium atom, a cobalt atom, a rhodium atom, a nickel atom, a palladium atom, a samarium atom and an ytterbium atom. $M^2$ in the general formula [1] is preferably a titanium atom, a zirconium atom, a hafnium atom, a vanadium atom, a chromium atom, an iron atom, a cobalt atom or a nickel atom, preferably in particular a titanium atom, a zirconium atom or a hafnium atom and most preferably a zirconium atom.

In the general formula [1], $L^2$ is a group having a cyclopentadiene type anion skeleton and a plural number of $L^2$ may be the same or different. A plural number of $L^2$ may be bonded directly or via a bridging group containing a carbon atom, a silicon atom, a nitrogen atom, an oxygen atom, a sulfur atom or a phosphorous atom.

The group having a cyclopentadiene type anion skeleton in $L^2$ includes an $\eta^5$-(substituted)-cyclopentadienyl group, an $\eta^5$-(substituted)-indenyl group and an $\eta^5$-(substituted)-fluorenyl group. An illustrative example includes an $\eta^5$-cyclopentadienyl group, an $\eta^5$-metylcyclopentadeinyl group, an $\eta^5$-ethylcyclopentadienyl group, an $\eta^5$-n-butylcyclopentadienyl group, an $\eta^5$-tert-butylcyclopentadienyl group, an $\eta^5$-1,2-dimethylcyclopentadienyl group, an $\eta^5$-1,3-dimethylcyclopentadienyl group, an $\eta^5$-1-methyl-2-ethylcyclopentadienyl group, an $\eta^5$-1-methyl-3-ethylcyclopentadienyl group, an $\eta^5$-1-tert-butyl-2-methylcyclopentadienyl group, an $\eta^5$-1-tert-butyl-3-methylcyclopentadienyl group, an $\eta^5$-1-methyl-2-isopropylcyclopentadienyl group, an $\eta^5$-1-methyl-3-isopropylcyclopentadienyl group, an $\eta^5$-1-methyl-2-n-butylcyclopentadienyl group, an $\eta^5$-1-methyl-3-n-butylcyclopentadienyl group, an $\eta^5$-1,2,3-trimethylcyclopentadienyl group, an $\eta^5$-1,2,4-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7- tetrahydroindenyl group, an $\eta^5$-2-methylindenyl group, an $\eta^5$-3-methylindenyl group, an $\eta^5$-4-methylindenyl group, an $\eta^5$-5-methylindenyl group, an $\eta^5$-6-methylindenyl group, an $\eta^5$-7-methylindenyl group, an $\eta^5$-2-tert-butylindenyl group, an $\eta^5$-3-tert-butylindenyl group, an $\eta^5$-4-tert-butylindenyl group, an $\eta^5$-5-tert-butylindenyl group, an $\eta^5$-6-tert-butylindenyl group, an $\eta^5$-7-tert-butylindenyl group, an $\eta^5$-2,3 dimehtylindenyl group, an $\eta^5$-4,7-dimehtylindenyl group, an $\eta^5$-2,4,7-trimethylindenyl group, an $\eta^5$-2-methyl-4-isopropylindenyl group, an $\eta^5$-4,5-benzindenyl group, an $\eta^5$-2-metyl-4,5-benzindenyl group, an $\eta^5$-4-phenylindenyl group, an $\eta^5$-2-methyl-5-phenylindenyl group, an $\eta^5$-2-methyl-4-phenylindenyl group, an $\eta^5$-2-methyl-4-naphthylindenyl group, an $\eta^5$-fluorenyl group, an $\eta^5$-2,7-dimethylfluorenyl group, an $\eta^5$-2,5-di-tert-butylfluorenyl group and their substituted compounds. In the present description, "$\eta^5$-" would be dropped from naming of the transition compound.

The group having the cyclopentadienyl anion skeleton may be bonded together directly or via a bridging group containing a carbon atom, a silicon atom, a nitrogen atom, an oxygen atom, a sulfur atom or a phosphorous atom. Such bridging group includes an alkylene group such as an ethylene group and a propylene group, a substituted alkylene group such as a dimethylmethylene group and diphenylmethylene group, a substituted silylene group such as a silylene group, dimethylsilylene group, a diphenylsilylene group and a tetramethylsilylene group and a hetero atom such as a nitrogen atom, an oxygen atom, a sulfur atom and a phosphorous atom.

$X^1$ in the general formula [1] is a halogen atom, a hydrocarbon group (excluding the group having the cyclopentadienyl type anion structure) or a hydrocarbon oxy group. An exemplary example of the halogen atom includes a fluorine atom, a chlorine atom, a bromine atom and an iodine atom. The hydrocarbon group herein does not include the group having the cyclopentadienyl type anion structure. The hydrocarbon group herein includes an alkyl group, an aralkyl group, an aryl group and an alkenyl group. The hydrocarbon oxy group includes an alkoxy group, an aralkyloxy group and an aryloxy group.

An alkyl group includes, for example, a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosanyl group. Any one of these alkyl groups may be substituted in part with a halogen atom such as a fluorine atom, a chlorine atom, a bromine atom or an iodine atom. An alkyl group substituted with a halogen atom includes, for example, a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group. Any one of these alkyl groups can be substituted in part with an alkoxy group such as a methoxy group and an ethoxy group, an aryloxy group such as a phenoxy group and an aralkyloxy group such as benzyloxy group.

An aralkyl group includes, for example, a benzyl group, a (2-methylphenyl)methyl group, a (3-methylphenyl)methyl group, a (4-methylphenyl)methyl group, a (2,3-dimetylphenyl)methyl group, a (2,4-dimetylphenyl)methyl group, a (2,5-dimetylphenyl)methyl group, a (2,6-dimetylphenyl)methyl group, a (3,5-dimetylphenyl)methyl group, a (3,4-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, (isopropylphenyl)methyl group, a (n-butylphenyl)methyl group, a (sec-butylphenyl)methyl group, a (tert-butylphenyl)methyl group, a (n-pentylphenyl) methyl group, a (neopentylphenyl) methyl group, a (n-hexylphenyl) methyl group, a (n-octylphenyl) methyl group, a (n-decylphenyl)methyl group, a (n-dodecylphenyl)methyl group, a naphthylmethyl group and an anthracenylmethyl group.

Any one of these aralkyl groups may be substituted in part with a halogen atom such as a fluorine atom, a chlorine atom, a bromine atom and a iodine atom, an alkoxy group such as a methoxy group and an ethoxy group, an aryloxy group such as a phenoxy group and an aralkyloxy group such as benzyloxy group. An aryl group includes, for example, a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. A one of these aryl groups may be substituted in part with a halogen atom such as a fluorine atom, a chlorine atom, a bromine atom and an iodine atom, an alkoxy group such as a methoxy group and an ethoxy group, an aryloxy group such as a phenoxy group and an aralkyloxy group such as a benzyl group.

An alkenyl group includes, for example, an allyl group, a methallyl group, a crotyl group and a 1,3-diphenyl-2-propenyl group.

An alkoxy group includes, for example, a methoxy group, an ethoxy group, a n-propoxy group, an isopropoxy group, a n-butoxy group, a sec-butoxy group, a tert-butoxy group, a n-pentoxy group, a neopentoxy group, a n-hexyloxy group, a n-octyloxy group, a n-dodecyloxy group, a n-pentadecyloxy group and a n-icosoylxy group. Any one of these alkoxy groups may be substituted in part with a halogen atom such as a fluorine atom, a chlorine atom, a bromine atom, an iodine atom, an alkoxy group such as a methoxy group and an ethoxy group, an aryloxy group such as a phenoxy group and an aralkyloxy group such as a benzyl group.

An aralkyloxy group includes, for example, a benzyloxy group, a (2-methylphenyl)methoxy group, (3-methylphenyl) methoxy group, a (4methylphenyl)methoxy group, a (2,3-dimethylphenyl)methoxy group, a (2,4-dimethylphenyl) methoxy group, a (2,5-dimethylphenyl)methoxy group, a (2,6-dimethylphenyl)methoxy group, a (3,4-dimethylphenyl) methoxy group, a (3,5-dimethylphenyl)methoxy group, a (2,3,4-trimetylphenyl)methoxy group, a (2,3,5-trimetylphenyl)methoxy group, a (2,3,6-trimetylphenyl)methoxy group, a (2,4,5-trimetylphenyl)methoxy group, a (2,4,6-trimetylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl) methoxy group, an (ethylphenyl)methoxy group, a (n-propylphenyl)methoxy group, an (isopropylphenyl)methoxy group, a (n-butylphenyl)methoxy group, a (sec-butylphenyl) methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. Any one of these aralkyloxy group may be substituted in part with a fluorine atom, a chlorine atom, a bromine atom, an iodine atom, an alkoxy group such as a methoxy group and an ethoxy group, an aryloxy group such as a phenoxy group and an aralkyloxy group such as a benzyl group.

An aryloxy group includes, for example, phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenyoxy group, a 2-tert-butyl-3,5-dimethylphenyoxy group, a 2-tert-butyl-3,6-dimethylphenyoxy group, a 2,6-di-tert-butyl-3-methylphenoxy group, 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group. Any one of these aryloxy groups may be substituted in part with a fluorine atom, a chlorine atom, a bromine atom, an iodine atom, an alkoxy group such as a methoxy group and an ethoxy group, an aryloxy group such as a phenoxy group and an aralkyloxy group such as a benzyloxy group.

"a" in the general formula [1] is a number satisfying the condition of $0<a\leqq8$ and "b" is the one satisfying the condition of $0<b\leqq8$, which are chosen corresponding to a valency of $M^2$. When $M^2$ is a titanium atom, a zirconium atom or a hafnium atom, "a" is preferably 2 and "b" is preferably 2.

Specific examples of the metallocene complex include bis (cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis (1-methyl-2-ethylcyclopentadienyl)titanium dichloride, bis (1-methyl-3-ethylcyclopentadienyl)titanium dichloride, bis (1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl) titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis (tetramethylcyclopentadienyl)titanium dichloride, bis (pentamethylcyclopentadienyl)titanium dichloride, bis (indenyl)titanium chloride, bis(4,5,6,7-tetrahydroindenyl) titanium dichloride, bis(fluorenyl)titanium dichloride, bis(2-phenylindenyl)titanium dichloride, bis[2-(bis(3,5-trifluoromethylpenyl)indenyl)titanium dichloride, bis[2-(4-tert-butylphenyl)indenyl]titanium dichloride, bis[2-(4-trifluoromethylphenyl)indenyl]titanium dichloride, bis[2-(4-metylphenyl)indenyl] titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl (indenyl)titanium dichloride, pentamethylcyclopentadienyl (fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis(3-methylcyclopentadienyl)titanium dichloride, dimethylsilylenebis(2-n-butylcyclopentadienyl)titanium dichloride, dimethylsilylenebis (3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2,3-ethylmethylcyclopentadienyl) titanium dichloride, dimethylsilylenebis(2,4-ethylmethylcyclopentadienyl) titanium dichloride, dimethylsilylenebis(2,5-ethylmethylcyclopentadienyl) titanium dichloride, dimethylsilylenebis(3,5-ethylmethylcyclopentadienyl) titanium dichloride, dimethylsilylenebis(2,3,4-trimethylcyclopentadienyl) titanium dichloride, dimethylsilylenebis(2,3,5-trimethylcyclopentadienyl) titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-metyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene (methylcyclopentadienyl)(indenyl)titanium dichloride, dimethylsilylene(n-butylcyclopentadienyl)(indenyl)titanium dichloride, dimethylsilylene(tetramethylcyclopentadienyl) (indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl) titanium dichloride, dimethylsilylene(tetramethylcyclopentadienyl)(indenyl) titanium dichloride, dimethylsilylene(indenyl)(fluorenyl)titanium dichloride, dimethylsilylenebis (fluorenyl)titanium dichloride, dimethylsilylene(cyclopentadienyl)(tetramethylcyclopentadienyl)titanium dichloride, dimethylsilylene(tetramethylcyclopentadienyl)(fluorenyl) titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropyllphenyl)titanium dichloride, pentamethylcyclopentadienyl(2,6-di-tert-butylphenyl) titanium dichloride, indenyl(2,6-diisopropylphenyl)titanium dichloride, fluorenyl(2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy)titanium dichloride, dimethylsilylene(cyclopentadienyl)(3,5-dimethyl-2-phenoxy) titanium dichloride, dimethylsilylene(cyclopentadienyl)(3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butylmethylsilyl-5-methyl-2-phenoxy)titanium dichloride, dimethylsilylene(cyclopentadienyl)(5-methyl-3-trimethylsilyl-2-phenoxy) titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy) titanium dichloride, dimethylsilylene(cyclopentadienyl)(3-phenyl-2-phenoxy) titanium dichloride, dimethylsilylene(cyclopentadienyl)(1-naphthoxy-2-yl) titanium dichloride, dimethylsilylene(methylcyclopentadienyl)(2-phenoxy) titanium dichloride, dimethylsilylene(methylcyclopentadienyl)(3-methyl-2-phenoxy) titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy) titanium dichloride, dimethylsilylene(methylcyclopentadienyl)(3,5-di-tert-butyl-2-phenoxy) titanium dichloride, dimethylsilylene(methylcyclopentadienyl)(5-methyl-3-phenyl-2-phenoxy) titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene(methylcyclopentadienyl)(1-naphthoxy-2-yl) titanium dichloride, dimethylsilylene(n-butylcyclopentadienyl)(2-phenoxy) titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthoxy-2-yl) titanium dichloride, dimethylsilylene(tert-butylcyclopentadienyl)(2-phenoxy) titanium dichloride, dimethylsilylene(tert-butylcyclopentadienyl)(3-methyl-2-phenoxy)titanium dichloride, dimethylsilylene(tert-butylcyclopentadienyl)(3,5-dimmethyl-2-phenoxy)titanium dichloride, dimethylsilylene(tert-butylcyclopentadienyl)(3-tert-butyl-2-phenoxy) titanium dichloride, dimethylsilylene(tert-butylcyclopentadienyl)(3-tert-butyl-5-methyl2-phenoxy) titanium dichloride, dimethylsilylene(tert-butylcyclopentadienyl)(3,5-di-tert-butyl-2-phenoxy) titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-trimethylsilyl-2-phenoxy) titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl)(3,5-diamyl-2-phenoxy)titanium dichloride, dimethylsilylene(tert-butylcyclopentadienyl)(3-phenyl-2-phenoxyl)titanium dichloride, dimethylsilylene(tert-butylcyclopentadienyl)(1-naphthoxy-2-yl)titanium dichloride, dimethylsilylene(tetarmethylcyclopentadienyl)(2-phenoxy) titanium dichloride, dimethylsilylene(tetarmethylcyclopentadienyl)(3-methyl-2-phenoxy)titanium dichloride, dimethylsilylene(tetarmethylcyclopentadienyl)(3,5-dimethyl-2-phenoxy)titanium dichloride, dimethylsilylene(tetarmethylcyclopentadienyl)(3-tert-butyl-2-phenoxy)titanium dichloride, dimethylsilylene(tetarmethylcyclopentadienyl)(3-tert-butyl-5-methyl-2-phenoxy)titanium dichloride, dimethylsilylene(tetarmethylcyclopentadienyl)(3,5-di-tert-butyl-2-phenoxy) titanium dichloride, dimethylsilylene(tetarmethylcyclopentadienyl)(5-methyl-3-phenyl-2-phenoxy)titanium dichloride, dimethylsilylene(tetarmethylcyclopentadienyl)(3-tertbutyldimethylsilyl-5-methyl-2-phenoxy)titanium dichloride, dimethylsilylene(tetarmethylcyclopentadienyl)(5-methyl-3-trimethylsilyl-2-phenoxy)titanium dichloride, dimethylsilylene(tetarmethylcyclopentadienyl)(3-tert-butyl-5-methoxy-2-phenoxy)titanium dichloride, dimethylsilylene(tetarmethylcyclopentadienyl)(3-tert-butyl-5-chloro-2-phenoxy)titanium dichloride, dimethylsilylene(tetarmethylcyclopentadienyl)(3,5-diamyl-2-phenoxy) titanium dichloride, dimethylsilylene(tetarmethylcyclopentadienyl)(3-phenyl-2-phenoxy) titanium dichloride, dimethylsilylene (tetarmethylcyclopentadienyl)(1-naphthoxy-2-yl)titanium dichloride, dimethylsilylene(trimethylsilylcyclopentadienyl)(2-phenoxy) titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy) titanium dichloride, dimethylsilylene(trimethylsilylcyclopentadienyl)(3-phenyl-2-phenoxy) titanium dichloride, dimethylsilylene(trimethylsilylcyclopentadienyl)(1-naphthoxy-2-yl)titanium dichloride, dimethylsilylene(indenyl)(2-phenoxy)titanium dichloride, dimethylsilylene(indenyl)(3-methyl-2-phenoxy) titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy) titanium dichloride, dimethylsilylene(indenyl)(3,5-di-tert-butyl-2-phenoxy) titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene(indenyl)(3-tert-butyl-5-chloro-2-phenoxy)titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphtoxy-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimetyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy)titanium dichloride, dimethylsilylene(fluorenyl)(5-methyl-3-phenyl-2-phenoxy)titanium dichloride, dimethylsilylene(fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3.5-diamyl-2-phenoxy)titanium dichloride, dimethylsilylene(fluorenyl) (3-phenyl-2-phenoxy)titanium dichloride, dimethylsilylene(fluorenyl)(1-naphthoxy-2-yl)titanium dichloride, (tert-butylamido)tetramethylcyclopentadienyl-1,2-ethanediyltitanium dichloride, (methylamido)tetramethylcyclopentadienyl-1,2-ethanediyltitanium dichloride, (ethylamido)tetramethylcyclopentadienyl-1,2-ethanediyltitanium dichloride, (tert-butylamido)tetramethylcyclopentadienyldimethylsilanetitanium dichloride, (benzylamido)tetramethylcyclopentadienyldimethylsilanetitanium dichloride, (phenylphosphorido)tetramethylcyclopentadienyldimethylsilanetitanium dichloride, (tert-butylamido)indenyl-1,2-ethanediyltitanium dichloride, (tert-butylamido)tetrahydroindenyl-1,2-ethanediyltitanium dichloride, (tert-butylamido)fluorenyl-1,2-ethanediyltitanium dichloride, (tert-butylamido)indenyldimethylsilanetitanium dichloride, (tert-butylamido)tetrahydroindenyldimethylsilanetitanium dichloride, (tert-butylamido)fluorenyldimethylsilanetitanium dichloride, (dimethylaminomethyl)tetramethylcyclopentadienytitanium (III) dichloride, (dimethylaminoethyl)tetramethylcyclopentadienytitanium (III) dichloride, (dimethylaminopropyl)tetramethylcyclopentadienytitanium (III) dichloride, (N-pyrroridinylethyl)tetramethylcyclopentadienytitanium dichloride, (B-dimethylaminoborabenzene)cyclopentadienyltitanium dichloride, cyclopentadienyl(9-mesitylboraantrhacenyl)titanium dichloride, zirconium or hafnium compounds to substitute the titanium atom in these compounds, compounds to substitute the phenoxy group with the 3-phenyl-2-phenoxy, 3-trimethylsilyl-2-phenoxy or 3-tert-butyldimethylsilyl-2-phenoxy group, compounds to substitute the dimethylsilylene group with the methylene, ethylene, dimethylmethylene (isopropylidene), diphenylmethylene, diethylsilylene, diphenylsilylene or dimethoxysilylene group, compounds to substitute the dichloride with the difluoride, dibromide, diode, dimethyl, diethyl, diisopropyl, diphenyl, dibenzyl, dimethoxide, diethoxide, di-n-propoxide, di-isopropoxide, diphenoxide or di-pentafluorophenoxide and compounds to substitute the trichloride with the trifluoride, tribromide, triiodide, trimethyl, triethyl, tri-isoproyl, triphenyl, tribenzyl, trimethoxide, triethoxide, tri-n-propoxide, tri-isopropoxide, triphenoxide or tri-pentfluorophenoxide.

Specific examples of μ-oxo type transition metal compound in [1] include μ-oxobis[isopropylidene(cyclopentadienyl)(2-phenoxy) titanium chloride], μ-oxobis[isopropylidene(cyclopentadienyl)(3-tert-butyl-5-methyl-2-phenoxy) titanium chloride], μ-oxobis[isopropylidene(methylcyclopentadienyl)(2-phenoxy) titanium chloride], μ-oxobis[isopropylidene(methylcyclopentadienyl)(3-tert-butyl-5-methyl-2-phenoxy)titanium chloride], μ-oxobis[isopropylidene(tetramethylcyclopentadienyl)(2-phenoxy)titanium chloride], μ-oxobis[isopropylidene(tetramethylcyclopentadienyl)(3-tert-butyl-5-methyl-2-phenoxy)titanium chloride], μ-oxobis[dimethylsilylene(cyclopentadienyl)(2-phenoxy) titanium chloride], μ-oxobis[dimethylsilylene(cyclopentadienyl)(3-tert-butyl-5-methyl-2-phenoxy)titanium chloride], μ-oxobis[dimethylsilylene(methylcyclopentadienyl)(2-phenoxy)titanium chloride], μ-oxobis[dimethylsilylene(methylcyclopentadienyl)(3-tert-butyl-5-methyl-2-phenoxy)titanium chloride], μ-oxobis[dimethylsilylene(tetramethylcyclopentadienyl)(2-phenoxy) titanium chloride] and μ-oxobis[dimethylsilylene(tetramethylcyclopentadienyl)(3-tert-butyl-5-methyl-2-phenoxy)titanium chloride]. It can be exemplified that a chloride of these compounds can be replaced with a fluoride, bromide, iodide, methyl, ethyl isopropyl, phenyl, benzyl, methoxide, ethoxide, n-propoxide, isopropoxide, phenoxide or pentafluorophenoxide.

The process for producing the ethylene-α-olefin copolymer of the present invention includes a process for producing an ethylene-α-olefin copolymer, which comprises copolymerizing ethylene and an α-olefin in the presence of a polymerization catalyst prepared by contacting the co-catalyst support (A) in which the co-catalyst component (I) described below is supported thereon, a metallocene complex (B) having a ligand in which two cyclopentadiene type anion skeletons are bonded through a bridging group such as an alkylene group or a silylene group, and an organoaluminum compound (C).

[Co-catalyst Support (A)]

The co-catalyst support (A) is obtained by contacting diethyl zinc as a component (a), two kinds of fluorinated phenols as a component (b), water as a component (c), inorganic fine particle-like support as a component (d) and trimethyldisilazane (($CH_3$)$_3$Si)$_3$NH) as a component (e).

The fluorinated phenol (b) includes pentafluorophenol, 3,5-difluorophenol, 3,4,5-trifluorophenol and 2,4,6-trifluorophenol. Two kinds of fluorinated phenols with a different number of the fluorine atom are preferred from the viewpoint of increasing the activation energy of flow of the ethylene-α-olefin copolymer and include, for example, a combination of pentafluorophenol/3,4,5-trifluorophenol, pentafluorophenol/2,4,6-trifluorophenol, and pentafluorophenol/3,5-difluorophenol. The combination of pentafluorophenol/3,4,5-trifluorophenol is preferred. A molar ratio of a fluorinated phenol with more fluorine atoms to that with less fluorine atom is usually from 10/90 to 90/10. A higher molar ratio is preferable from the viewpoint of increasing the molecular weight distribution of the ethylene-α-olefin copolymer obtained and particularly preferably 50/50 or more.

The inorganic fine particle-like support (d) is preferably silica gel.

The amounts of the above-mentioned components (a), (b) and (c) are not particularly restricted, and when the molar ratio (a):(b):(c) of the amounts used of the components is 1:x:y, it is preferable that x and y satisfy the following formula:

$$|2-x-2y| \leq 1$$

In the above-mentioned formula, x represents a number of preferably from 0.01 to 1.99, more preferably from 0.10 to 1.80, further preferably from 0.20 to 1.50, most preferably from 0.30 to 1.00.

Regarding the used amount of (d) based on (a), the amount of a zinc atom derived from (a) contained in particles obtained by contact of (a) with (d) is preferably 0.1 mmol or more, more preferably 0.5 to 20 mmol in terms of molar number of zinc atoms contained in 1 g of the resulted particle. Regarding the amount of (e) based on (d), the amount of (e) is preferably 0.1 mmol or more, more preferably 0.5 to 20 mmol per g of (d).

As a metal of (B) the metallocene complex having a structure in which two ligands having a cyclopentadiene type anion skeleton are connected each other through abridging group such as an alkylene group or silylene group, metals of Group 4 of the Periodic Table of the Elements are preferable, and zirconium and hafnium are more preferable.

Further, examples of the ligand having a cyclopentadiene skeleton include preferably an indenyl group, methylindenyl group, methylcyclopentadienyl group and dimethylcyclopentadienyl group, and examples of the bridging group include preferably an ethylene group, dimethylmethylene group and dimethylsilylene group. Furthermore, the remaining two groups bonded to the metal, include preferably, for example, a phenoxy group or alkoxy group.

As the metallocene complex (B), ethylenebis (1-indenyl) zirconium diphenoxide is preferably illustrated. Examples of the organoaluminum compound (C) include trimethyl aluminum, triethylaluminum, tri-n-butylaluminum, triisobutylaluminum and tri-n-octylaluminum, and triisobutylaluminum or tri-n-octylaluminum is preferred.

The use amount of the metallocene complex (B) is preferably $5 \times 10^{-6}$ to $5 \times 10^{-4}$ mol per g of the co-catalyst support (A). The amount of the organoaluminum compound (C) is preferably from 1 to 2000 in terms of the ratio (Al/M) of the molar number of an aluminum atom (Al) in the organoaluminum compound (C) to the molar number of the metal atom (M) in the metallocene complex (B).

In the polymerization catalyst described above prepared by contacting the components (A), (B) and (C), if necessary, an electron donor (D) may be contacted in addition thereto. The electron donor (D) is preferably triethylamine or tri-n-octylamine.

From the viewpoints of broadening of the molecular weight distribution, it is preferable to use the electron donor (D), and the used amount of the (D) is preferably 0.1 mol % or more per mole of Al atom in the organoaluminum compound (C), more preferably 1 mol % or more. On the other hand, from the viewpoint of heightening the polymerization activity, the amount is preferably 10 mol % or less, more preferably 5 mol % or less.

A process for producing the ethylene-α-olefin copolymer of the present invention preferably includes a process for producing the ethylene-α-olefin copolymer with a prepolymerization solid component obtained by polymerization of a small amount of an olefin with the solid co-catalyst component supporting the co-catalyst component (1) on the fine particle-like support (hereinafter, referred to as "prepolymerization"), for example, the prepolymerization (prepolymerization) solid component obtained by prepolymerization of an olefin with the solid co-catalyst component, a metallocene complex and an alkylating agent (e.g. organoaluminum compound).

Examples of the alkylating agent include trimethyl aluminum, triethylaluminum, tri-n-butylaluminum, triisobutylaluminum and tri-n-octylaluminum, and triisobutylaluminum or tri-n-octylaluminum is preferred.

The olefin used in the prepolymerization includes ethylene, propylene, 1-butene, 1-pentene, 1-hexene, octene-1, 4-methyl1-pentene, cyclopentene and cyclohexene. These can be used singly or a combination of more than two kinds. Ethylene alone or a combination of ethylene with the olefin other than ethylene is preferably used, and single use of ethylene is more preferred from a viewpoint of reducing the number of minute defects in the ethylene-α-olefin copolymer obtained.

An intrinsic viscosity ([η]; unit, dl/g) of the polymer in the prepolymerization solid component obtained by the prepolymerization is preferably 1.2 dl/g or more, more preferably 1.4 dl/g or more, further preferably greater than 1.6 dl/g or more and most preferably 1.7 dl/g or more from a viewpoint of reducing the number of minute defects in the ethylene-α-olefin copolymer obtained. On the other hand, the intrinsic viscosity is preferably 2 dl/g or less from a viewpoint of reducing fisheyes in the ethylene-α-olefin copolymer obtained. A method of controlling the intrinsic viscosity within the above range includes a method of adjusting a concentration of a molecular weight regulator such as hydrogen in the prepolymerization. This includes methods of (1) controlling of a hydrogen concentration by conducting a multi-step prepolymerization, in which the prepolymerization in the first step is initiated at zero to low concentration of hydrogen to produce a polymer with an intrinsic viscosity higher than a target viscosity in the first step, and subsequently, the prepolymerization in the second step or further the later step(s) is carried out under high concentration of hydrogen to produce a polymer with an intrinsic viscosity lower than the target viscosity in the second step or further the later step(s) to produce a polymer with the target viscosity as a whole in the prepolymerization, and (2) keeping hydrogen concentration at desired level in the prepolymerization to yield a polymer with a target viscosity. Method (1) is preferred from the viewpoint of reducing the number of minute defects in the ethylene-α-olefin copolymer obtained.

The amount of the prepolymer in the prepolymerization solid component formed in the prepolymerization is preferably 0.1 g or more per 1 g of the solid co-catalyst component, more preferably 0.5 g or more and further preferably 1 g or more. In addition, the amount of the prepolymer is preferably 1000 g or less per 1 g of the solid co-catalyst component, more preferably 500 g or less and further preferably 200 g or less.

Heat of fusion of crystal in the polymer obtained by the prepolymerization, that is, the prepolymer is preferably 160 J/g or more and more preferably 180 J/g or more. Such polymer, for example, a polymer containing ethylene as a main monomer unit (ethylene-based polymer) includes usually an ethylene-based polymer containing ethylene monomer units of 96% by weight or more based on the total monomer units in the copolymer.

From the viewpoint of reducing the number of minute defects in the ethylene-α-olefin copolymer obtained, preferably, the prepolymer having an intrinsic viscosity of 2 dl/g or more in the prepolymerization is produced in an amount of 0.1 g or more after initiation of the prepolymerization, more preferably 0.5 g or more. The amount of the prepolymer produced is preferably 5 g or less, more preferably 2 g or less and further preferably 1 g or less.

The intrinsic viscosity of the prepolymer is preferably 2 dl/g or more from the viewpoint of reducing the number of minute defects in the ethylene-α-olefin copolymer obtained. The intrinsic viscosity of the prepolymer is preferably 4 dl/g or less and more preferably 3.5 dl/g or less from the viewpoint of reducing fisheyes in the ethylene-α-olefin copolymer obtained.

A method of the prepolymerization may be either continuous or batch polymerization method, for example, including a batch slurry polymerization method, a continuous slurry polymerization method and a continuous gas phase polymerization method. A method of feeding each catalyst component such as the solid co-catalyst component, metallocene complex and alkylating agent (organoaluminum compound) into a polymerization reactor for the prepolymerization is usually a method of feeding them under a water-free condition or as a solution or slurry of each component using an inert gas such as nitrogen or argon, hydrogen and ethylene. There is preferred a method of feeding each catalyst component to a polymerization reactor, from the viewpoint of reducing the number of minute defects in the ethylene-α-olefin copolymer obtained, so that the alkylating agent is contacted with a contact-treated product formed by contacting the solid co-catalyst component with the metallocene complex to form the prepolymerization catalyst. For example, the method includes (1) a method of feeding the alkylating agent to a polymerization reactor after feeding both solid co-catalyst component and metallocene complex to the polymerization reactor, (2) a method of feeding the alkylating agent into a polymerization reactor after feeding a contact-treated product obtained by which the solid co-catalyst component was previously contacted with the metallocene complex, (3) a method of feeding a contact-treated product obtained by contacting the solid co-catalyst component with the metallocene complex into a polymerization reactor in which the alkylating agent was previously fed, and (4) a method of feeding into a polymerization reactor a contact-treated product prepared by contacting the alkylating agent with a treated product which has been obtained by previously contacting the solid co-catalyst component with the metallocene complex, are illustrated. A prepolymerization temperature is usually a temperature lower than a melting point of the prepolymerized polymer, preferably from 0 to 100° C., more preferably from 10 to 70° C.

When the prepolymerization is conducted by slurry polymerization, a solvent used includes a hydrocarbon having not more than 20 carbon atoms. For example, the hydrocarbon includes a saturated aliphatic hydrocarbon such as propane, n-butane, isobutene, n-pentane, iso-pentane, n-hexane, cyclohexane, heptane, octane and decane; and an aromatic hydrocarbon such as benzene, toluene and xylene, and these hydrocarbons can be used singly or in combination of 2 or more.

As a method of producing the ethylene-α-olefin copolymer, a continuous polymerization method accompanying formation of particles of the ethylene-α-olefin copolymer is preferred. For example, a continuous gas phase polymerization method, a continuous slurry polymerization method and a continuous bulk polymerization method are preferable, and a continuous gas phase polymerization method is more preferable. A gas phase polymerization reactor used in the gas phase polymerization method is usually an apparatus equipped with a fluidized bed type reaction vessel and preferably a fluidized bed reaction vessel having an enlarged portion section. A stirring blade may be installed in the reaction vessel.

As a method of feeding the prepolymerized solid catalyst component into a continuous polymerization reactor for which polymerization accompanying formation of particles of an ethylene-α-olefin copolymer particles is conducted, a method of feeding the catalyst component usually using an inert gas such as nitrogen or argon, hydrogen or ethylene under a water-free condition or a method of feeding it as a slurry after dispersing with a solvent is used.

A polymerization temperature for a continuous polymerization accompanying formation of ethylene-α-olefin copolymer particles is usually below a melting temperature of the ethylene-α-olefin copolymer, preferably from 0 to 150° C., more preferably from 30 to 100° C. The temperature is preferably lower than 90° C. and specifically in a range of from 70° C. to 87° C. from the viewpoint of heightening gloss of the molding. Hydrogen may be added as a molecular weight regulator in order to adjust melt flow property of the ethylene-α-olefin copolymer. Furthermore, an inert gas may coexist in a mixed gas. When the prepolymerized solid catalyst component is used, a co-catalyst component such as the organoaluminum compound may be properly used.

The ethylene-α-olefin copolymer of the present invention may contain a heretofore known additive if needed. The additive includes, for example, antioxidants, weathering agents, lubricants, anti-blocking agents, antistatic agents, antifogging agents, anti-dripping agents, pigments and fillers.

The ethylene-α-olefin copolymer of the present invention can be molded by a heretofore known molding method, for example, an extrusion method such as a blown film extrusion method and a T-shaped die film extrusion method, an injection molding method and a compression molding method to various moldings (film, sheet, bottle and tray). The extrusion molding method is preferably used as the molding method, and obtained moldings are widely used in food packaging, surface protection and the like.

EXAMPLES

The present invention is explained in detail by the following Examples and Comparative Examples. Physical properties in Examples and Comparative Examples are measured with the following methods.

[Physical Properties of Polymer]

(1) Melt Flow Rate (MFR; unit, g/10 min)

The melt flow rate was measured under a load at 21.18 N at a temperature at 190° C. according to A method of JIS K7210-1995.

(2) Melt Flow Rate Ratio (MFRR)

MFRR is a value of the melt flow rate (MFR-H; unit, g/10 min) measured under a load at 211.82 N and a temperature at 190° C. according to A method of JIS K7210-1995 divided by the melt flow rate (MFR) measured under a load at 21.18 N at a temperature at 190° C. according to the method of JIS K7210-1995.

(3) Density (unit, Kg/m$^3$)

The density was measured according to A method of JIS K7112-1980. A sample was previously annealed according to JIS K6760-1995 prior to the measurement.

(4) Activation Energy of Flow (Ea, unit, kJ/mole)

(5) Activation Energy of Flow (Ea, unit: kJ/mol)

Melt complex viscosities and angular frequencies at 130° C., 150° C., 170° C. and 190° C. were measured under the following conditions using a viscoelasticity measuring apparatus (Rheometrics Mechanical Spectrometer RMS-800 manufactured by Rheometrics, Limited) to prepare a melt complex viscosities-angle frequency curve. From the curve obtained, a master curve of melt complex viscosities-angular frequency at 190° C. was prepared using a computer software Rhios V.4.4.4 (manufactured by Rheometrics, Limited) and the activation energy (Ea) was determined.

<Measurement Condition>
Geometry: parallel plate
Plate diameter: 25 mm
Plate distance: 1.5 to 2 mm
Strain: 5%
Angle frequency: 0.1 to 100 rad/minute
Measurement atmosphere: nitrogen (5) Molecular Weight Distribution (Mw/Mn)

A weight average molecular weight (Mw) and a number average molecular weight (Mn) were measured with a gel permeation chromatography (GPC) method under the following conditions (1) to (8) to determine a molecular weight distribution (Mw/Mn). A base line in a chromatogram was set by a straight line, of which a point in a stable horizontal region with a retention time sufficiently shorter than the one of a sample elution peak appeared was connected with a point in a stable horizontal region with a retention time sufficiently longer than the one of a solvent elution peak observed.

(i) Instrument: Waters 150C manufactured by Waters Co., Ltd.
(ii) Separation column: TOSOH TSK gel GMH6-HT
(iii) Measurement temperature: 140° C.
(iv) Carrier liquid: ortho-dichlorobenzene
(v) Flow rate: 1.0 mL/min.
(vi) Amount injected: 500 μL
(vii) Detector: differential refractometer
(iix) Standard substance for molecular weight: Standard polystyrene (6) Intrinsic Viscosity ([η]; unit, dl/g)

A solution of 0.5 g/L of 2,6-di-t-butyl-p-cresol (BHT) dissolved in tetralin (hereinafter, referred to as "blank solution") and a solution of 1 mg/mL of the ethylene-α-olefin copolymer in the blank solution (hereinafter refer to a sample solution) were prepared. A falling time of both blank and sample solutions was measured at 135° C. with an Ubbelohde type viscometer to determine a relative viscosity (ηrel) at 135° C. from the falling time and then an intrinsic viscosity from the following equation.

$$[\eta] = 23.3 \times \log(\eta rel)$$

(7) Heat of Fusion of Crystal (unit, J/g)

Using a differential scanning calorimeter (input compensation type PYRIS Diamond DSC manufactured by PERKIN-ELMER Co.), 8 to 10 mg of the sample was heated to 150° C. to melt and then cooled to 40° C. at a rate of 5° C./min and then heated again to 150° C. at a rate of 5° C./min. A thermograph obtained was used to determine heat of fusion of crystal per unit mass.

(8) Intrinsic Viscosity of Polymer Component Formed in Second Step of Prepolymerization Process (unit, dl/g)

The intrinsic viscosity of the polymer component formed in a second stage of the prepolymerization process was calculated by the following equation.

$$[\eta]2 = ([\eta]T - [\eta]1 \times W1/(W1+W2)) \times (W1+W2)/W2$$

wherein [η]1 is an intrinsic viscosity of the polymer formed in a first step of the prepolymerization process (dl/g), [η]2 is an intrinsic viscosity of the polymer formed in a second step of the prepolymerization process (dl/g), [η]T is an intrinsic viscosity of the polymer formed in first and second steps of the prepolymerization process (dl/g), W1 is an amount of the polymer formed in the first step of the prepolymerization process (% by weight) and W2 is an amount of the polymer formed in the second step of the prepolymerization process (% by weight).

(9) Minute Defects (unit, number/m$^2$)

Using an inflation film forming machine from SHI Modern Machinery Ltd.) (full flight type single screw extruder (diameter 40 mm, L/D=26) and a circular die (die diameter 75 mmφ, lip gap 1 mm)), the copolymer was extruded at a molding temperature of 170° C., a throughput of 12.5 kg/h and a blow up ratio of 1.8 to an inflation film with 30 μm in thickness. The inflation film obtained was cut to prepare test specimens having a size of 30 cm in length and 20 cm in width, five of which were used respectively to count the number of dark defects with a size from 75 μm×70 μm to 225 μm×214 μm under the following conditions using a digital defect inspection apparatus (GX70LT from Mamiya OP Co., Ltd.). The count of dark defects per 1 m$^2$ of specimen is given in a table.

(1) Detection threshold value: 30 or more
(2) Threshold value of detection setting: 24 or more
(3) Light source gain: 1.0
(4) Readout speed: 30 m/min
(5) Lower limit of detected size: 4 pixels in vertical and 2 pixels in horizontal
(6) Average transmitted light intensity: 100
(7) Measured range: 12 cm in lengthwise and 16.35 cm in lateral

[Moldability]

(10) Resin Pressure (unit, MPa)

A resin pressure was measured when an inflation film with a 50μ in thickness was molded using an inflation film extruder from Placo Co., Ltd. (single screw extruder (diameter, 30 mm, L/D=28) with a full flight type screw, a die (die diameter 50 mm, lip gap 0.8 mm) and double slit air ring) under the molding condition at a molding temperature of 170° C., a throughput of 5.5 kg/hr, a frost line distance (FLD) of 200 mm and a blow ratio of 1.8. Lower the resin pressure is, moldability is more excellent.

[Film Property]

(11) Flickering

The above blown film with 50μ in thickness obtained was held up against a fluorescent lamp and glare of the film by light from the fluorescent lamp was visually evaluated as follows.
 o: very little flickering
 x: extensive flickering Example 1

(1) Preparation of Co-catalyst Support

To a reactor equipped with a stirrer and purged with nitrogen were added silica 2.8 kg (Sylopol 948, manufactured by Davison Co., Ltd.; 50% volume average particle diameter, 55 μm; pore volume, 1.67 ml/g and specific surface area, 325 $m^2/g$) heat-treated at 300° C. under a stream of nitrogen and toluene 24 kg. The mixture was stirred and then cooled to 5° C. Thereafter, a mixed solution of 1,1,1,3,3,3-hexamethyldisilazane 0.91 kg and toluene 1.43 kg was added dropwise over 33 minutes while keeping the reactor temperature of 5° C. After completion of the dropping, the mixture was stirred at 5° C. for one hour, heated to 95° C., stirred at 95° C. for three hours and then filtered. The solid product obtained was washed six times with each 21 kg of toluene. Then, 6.9 kg of toluene was added to the solid product to form a slurry, which was allowed to stand overnight.

To the above slurry obtained were added a hexane solution of diethyl zinc (concentration of diethyl zinc, 50% by weight) 2.05 kg and hexane 1.3 kg, which was stirred. The mixture was then cooled to 5° C., to which a mixed solution of pentafluorophenol 0.77 kg and toluene 1.17 kg was added dropwise over 61 minutes while keeping the temperature of reactor of 5° C. After completion of the dropping, the mixture was stirred at 5° C. for one hour, heated to 40° C. and stirred at 40° C. for one hour. Then, the mixture was cooled to 5° C., to which water 0.11 kg was added over 1.5 hour while keeping the temperature of reactor of 5° C. After completion of the dropping, the mixture was stirred at 5° C. for 1.5 hours, heated to 55° C. and stirred at 55° C. for two hours. Then, to the mixture were added a hexane solution of diethyl zinc (concentration of diethyl zinc, 50% by weight) 1.4 kg and hexane 0.8 kg at ambient temperature. After cooling to 5° C., a mixed solution of 3,4,5-trifluorophenol 0.42 kg and toluene 0.77 kg was added to the mixture over 60 minutes while keeping the temperature of reactor at 5° C. After completion of the addition, the mixture was stirred at 5° C. for one hour, heated to 40° C. and stirred at 40° C. for one hour. The mixture was then cooled to 5° C., to which water 0.077 kg was added over 1.5 hours while the temperature of reactor was kept at 5° C. After completion of the dropping, the mixture was stirred at 5° C. for 1.5 hours, heated to 40° C., stirred at 40° C. for two hours, further heated to 80° C. and stirred at 80° C. for two hours. After stirring, a supernatant liquid was taken out up to 16 L of the remaining amount at ambient temperature, to which toluene 11.6 kg was added. The mixture was heated to 95° C. and stirred for four hours. After stirring, the supernatant liquid was taken out at ambient temperature to yield a solid product. The solid product obtained was washed with toluene 20.8 kg four times and with hexane 24 L three times. Then, drying yielded a solid component (hereinafter refer to a co-catalyst support (a)).

(2) Preparation of Prepolymerized Catalyst Component

An autoclave of inner volume of 210 liter equipped with a stirrer was purged with nitrogen, to which butane 80 liter was charged. racemi-ethylenebis(1-indenyl)zirconium diphenoxide 106 mmol was added to the autoclave, which was heated to 50° C. and stirred for two hours. The above co-catalyst support (a) 0.7 kg was then added to the mixture in the autoclave, which was cooled to 30° C. to stabilize the mixture. Ethylene was then charged into the autoclave up to a vapor phase pressure of 0.03 MPa, to which triisobutylaluminum 158 mmol was subsequently added to initiate polymerization. After ethylene was continuously fed at a rate of 0.7 kg/hr for 30 minutes, the mixture was heated to 51° C., to which ethylene and hydrogen were continuously charged at a rate of 3.5 kg/hr and 5.5 liter (in terms of volume at normal temperature and normal pressure)/hr, respectively, to run the prepolymerization for a total of four hours. After completion of the polymerization, ethylene, butane and hydrogen were discharged to leave a solid, which was dried under vacuum at ambient temperature to yield a prepolymerized catalyst component comprising polyethylene 15 g per g of the co-catalyst support (a). [η] and heat of fusion of the polyethylene were 1.75 dl/g and 190 J/g, respectively. In the prepolymerization, a small amount of a sample was withdrawn from the bottom of reactor at a time of 30 minutes after addition of triisobutylaluminum. An amount of prepolymerized polyethylene in the prepolymerized catalyst component sample was 0.6 g per g of the co-catalyst support (a) and [η] of the polyethylene was 3.0 dl/g. [η] evaluated for polyethylene formed in a time later than 30 minutes after addition of triisobutylaluminum was 1.7 dl/g.

(3) Manufacture of Ethylene-α-olefin Copolymer

Using the above prepolymerized catalyst component obtained, ethylene and 1-hexene were copolymerized in a continuous fluidized bed vapor phase polymerization apparatus to yield polymer powder. A polymerization condition was such that polymerization temperature was 87° C., polymerization pressure was 2 MPa, a molar ratio of hydrogen to ethylene was 1.4% and a molar ratio of 1-hexene to a sum of ethylene and 1-hexene was 0.7%. Ethylene, 1-hexene and hydrogen were continuously fed in order to keep the gas component constant during polymerization. The above prepolymerized catalyst component, triisobutylaluminum and triethylamine (molar ratio against triisobutylaluminum, 3%) were continuously fed to the mixture to keep a total weight of powder on the fluidized bed at 80 kg. An average polymerization time was 4 hours. An antioxidant (Sumilizer GP from Sumitomo Chemical Co., Ltd.) 750 ppm was added to the polymer powder obtained, which was pelletized by an extruder (LCM 50 from Kobe Steel Ltd.) under the condition of a feed rate of 50 kg/hr, a number of revolution of screw at 450 rpm, a gate opening of 50%, a suction pressure of 0.1 MPa and a resin temperature at 200-230° C. to yield the ethylene-1-hexene copolymer. Results with the evaluation of physical properties of the ethylene-1-hexene copolymer obtained are shown in Table 1.

Example 2

(1) Preparation of Prepolymerized Catalyst Component

An autoclave of inner volume of 210 liter equipped with a stirrer was purged with nitrogen, to which butane 80 liter was charged. racemi-ethylenebis(1-indenyl)zirconium diphenoxide 108 mmol was added to the autoclave, which was heated to 50° C. and stirred for two hours. After the autoclave was cooled to 30° C. to stabilize the mixture, ethylene was charged to the autoclave to the vapor phase pressure of 0.03 MPa. The co-catalyst support (a) 0.7 kg obtained in Example 1, (1), Preparation of the preparation of co-catalyst support was added to the mixture, to which triisobutylaluminum 158 mmol was subsequently added to initiate polymerization. After ethylene was continuously fed at a rate of 0.7 kg/hr for 30 minutes, the mixture was heated to 50° C., to which ethylene and hydrogen were continuously charged at a rate of 3.5 kg/hr and 7 liter (in terms of volume at normal temperature and normal pressure)/hr, respectively, to run the prepolymerization for a total of four hours. After completion of the polymerization, ethylene, butane and hydrogen were discharged to leave a solid, which was dried under vacuum at ambient temperature to yield a prepolymerized catalyst component comprising polyethylene 16 g per g of the co-catalyst support (a). [η] of the polyethylene was 1.64 dl/g.

(2) Manufacture of Ethylene-α-olefin Copolymer

Using the above prepolymerized catalyst component, ethylene and 1-hexene were copolymerized in a continuous fluidized bed vapor phase polymerization apparatus in the same manner as in Example 1 except a molar ratio of hydrogen to ethylene changed to 1.5% and that of 1-hexene to a sum of ethylene and 1-hexene to 1.1%, respectively, yielding a copolymer, which was palletized in the same manner as in Example 1 to yield the ethylene-1-hexene copolymer. Results with the evaluation of physical properties of the ethylene-1-hexene copolymer obtained are shown in Table 1.

Example 3

(1) Preparation of Prepolymerized Catalyst Component

Preliminary polymerization was run in the same manner as in Example 2, (1) Preparation of prepolymerized catalyst component except an amount of racemi-ethylenebis (indenyl) zirconium phenoxide and triisobutylaluminum changed to 73 mmol and 210 mmol, respectively, yielding a prepolymerized catalyst component containing polyethylene 14 g per g of the co-catalyst support (a). [η] of the polyethylene was 1.53 dl/g.

(2) Production of Ethylene-α-olefin Copolymer

Using the above prepolymerized catalyst component obtained, ethylene and 1-hexene were copolymerized in a continuous fluidized bed vapor phase polymerization apparatus in the same manner as in Example 1 except a molar ratio of hydrogen to ethylene changed to 1.2% and that of hexene-1 to the sum of ethylene and hexene-1 to 1%, respectively, yielding a copolymer, which as palletized in the same manner as in Example 1 to yield the ethylene-1-hexene copolymer. Results with the evaluation of physical properties of the ethylene-1-hexene copolymer obtained are shown in Table 1.

Comparative Example 1

(1) Preparation of Prepolymerized Catalyst Component

The co-catalyst support (a) 0.7 kg obtained in Example 1(1) was added to an autoclave with an inner volume of 210 L, which was purged in advance with nitrogen. Hydrogen 3 L (volume at ambient temperature and normal pressure) and butane 80 L were charged into the autoclave, which was heated to 30° C. After ethylene was charged to the autoclave up to a gas phase pressure of 0.03 MPa. After the system was stabilized, triisobutylaluminum 210 mmol and racemi-ethylenebis (1-indenyl) zirconium phenoxide 70 mmol were added to initiate polymerization. The mixture was heated to 31° C., to which ethylene and hydrogen were continuously fed at a rate of 0.4 kg/hr and 3.2 L (in terms of volume at normal temperature and normal pressure)/hr, respectively, over 30 minutes and then heated to 51° C., at which ethylene and hydrogen were continuously fed at a rate of 2.8 kg/hr and 28 L (in terms of volume at normal temperature and normal pressure)/hr, respectively, to run the prepolymerization over a total of four hours. After completion of the polymerization, ethylene, butane and hydrogen were discharged to leave a solid, which was dried under vacuum at ambient temperature, to obtain a prepolymerized catalyst component containing polyethylene 13 g per 1 g of the co-catalyst support (a). An [η] of the polyethylene was 0.83 dl/g.

(2) Production of Ethylene-α-olefin Copolymer

Using the above prepolymerized catalyst component, ethylene and 1-hexene were copolymerized in a continuous fluidized bed gas phase polymerization apparatus in the same manner as in Example 1 except the polymerization temperature was changed to 75° C., the molar ratio of hydrogen to ethylene was changed to 0.6% and the molar ratio of 1-hexene to a total of ethylene and 1-hexene was changed to 1.5%, respectively, yielding a copolymer, which was palletized in the same manner as in Example 1 to yield an ethylene-1-hexene copolymer. Results with the evaluation of physical properties of the ethylene-1-hexene copolymer obtained are shown in Table 1.

Comparative Example 2

(1) Preparation of Prepolymerized Catalyst Component

The co-catalyst support (a) 0.7 kg obtained in Example 1(1) was added to an autoclave with an inner volume of 210 L, which was purged in advance with nitrogen. Butane 80 L was charged to the autoclave, which was then heated to 30° C. Further, ethylene was charged to the autoclave up to a gas phase pressure of 0.03 MPa. After the system was stabilized, triisobutylaluminum 210 mmol and racemi-ethylenebis(1-indenyl)zirconium phenoxide 70 mmol were added to the mixture to initiate polymerization. The autoclave was heated to 31° C., to which ethylene and hydrogen were continuously fed at a rate of 0.5 kg/hr and 0.5 L (in terms of volume at normal temperature and normal pressure)/hr, respectively, over 30 minutes and then heated to 51° C., at which ethylene and hydrogen were continuously fed at a rate of 2.8 kg/hr and 4.1 L (in terms of volume at normal temperature and normal pressure)/hr, respectively, to run the prepolymerization over a total of four hours. After completion of the polymerization, ethylene, butane and hydrogen were discharged to leave a solid, which was dried under vacuum at ambient temperature, to obtain a prepolymerized catalyst component containing polyethylene 10 g per 1 g of the co-catalyst support (a). An [η] of the polyethylene was 1.53 dl/g.

(2) Production of Ethylene-α-olefin Copolymer

Using the above prepolymerized catalyst component obtained, ethylene and 1-hexene were copolymerized in a continuous fluidized bed gas phase polymerization apparatus in the same manner as in Comparative Example 1 except the molar ratio of hydrogen to ethylene was changed to 1% and that of 1-hexene to a sum of ethylene and 1-hexene was changed to 1.5 to obtain a copolymer, which was pelletized in the same manner as in Example 1 to yield an ethylene-1-hexene copolymer. Results with the evaluation of physical properties of the ethylene-1-hexene copolymer obtained are shown in Table 1.

Comparative Example 3

(1) Preparation of Co-catalyst Support

After a stainless steel reactor of an inner volume 180 L equipped with a stirrer and a jacket was purged with nitrogen, silica 9.7 kg (Sylopol 1948 manufactured by Davison Co.; 50% volume average particle diameter, 58 μm; pore volume, 1.65 ml/g and specific surface area, 298 m$^2$/g) heated at 300° C. under a stream of nitrogen and toluene 100 L were added. After cooled to 2° C., a toluene solution of methylaluminoxane (PMAO-s manufactured by Tosoh Finechem Corp.) 23.3 kg (75.9 mol as aluminum atom) was added dropwise to the mixture over 62 minutes. After completion of the addition, the mixture was stirred at 5° C. for 30 minutes, heated to 95° C. over two hours and stirred at 95° C. for four hours. The mixture was then cooled to 40° C. and transferred to a stainless steel reactor of an inner volume 180 L equipped with a stirrer and a jacket. A silica-derived component was precipitated over 50 minutes to separate from the liquid layer component. In a washing operation, toluene 100 L was then added to the precipitate and stirred for 10 minutes to precipitate a silica-derived component over roughly 45 minutes to separate from the upper layer of slurry. The above washing operation was repeated three times. The precipitate was slurried with toluene 120 L to transfer to a stainless steel filtration apparatus of an inner volume 430 liter (filtration apparatus equipped with a filter, a stirrer and a jacket) purged with nitrogen. The mixture was stirred for 10 minutes and filtered, to which toluene 100 L was added again to stir for 10 minutes and filter. This washing operation was repeated twice. The silica-derived solid was slurried with hexane 70 L to transfer to a stainless steel drier of an inner volume of 210 L (drier equipped with a stirrer and a jacket) purged with nitrogen. The mixture was then dried under a stream of nitrogen at a jacket temperature of 80° C. for 7.5 hours to yield a solid component (hereinafter referred to as co-catalyst support (S)) of 12.6 kg.

(2) Preparation of Prepolymerized Catalyst Component

Butane 120 L containing triisobutylaluminum at concentration of 2.5 mmol/liter and hydrogen 40 L (in terms of volume at normal temperature and normal pressure) were charged to an autoclave of an inner volume of 210 liter equipped with a stirrer and was purged in advance with nitrogen, and then heated to 47° C. After ethylene was charged in an amount corresponding to 0.3 MPa of gas phase pressure in the autoclave to stabilize the mixture, triisobutylaluminum 300 mmol and racemi-ethylenebis (1-indenyl) zirconium dichloride 15 mmol and then the co-catalyst support (S) 0.25 kg were added to initiate polymerization. Both ethylene and hydrogen were continuously charged to the mixture to run the prepolymerization for four hours in total. After completion of the polymerization, ethylene, butane and hydrogen were discharged to yield a solid, which was dried under vacuum at ambient temperature to obtain a prepolymerized catalyst component containing polyethylene 33 g per g of the co-catalyst support (S). An [η] of the polyethylene was 0.85 dl/g.

(3) Production of Ethylene-α-olefin Copolymer

Using the above prepolymerized catalyst component obtained, ethylene and 1-hexene were copolymerized in a continuous fluidized bed gas phase polymerization apparatus in the same manner as in Comparative Example 1 except the polymerization temperature was changed to 85° C., the molar ratio of hydrogen to ethylene was changed to 0.15%, and the molar ratio of 1-hexene to a sum of ethylene and 1-hexene was changed to 1.8%, and no triethylamine was fed, to obtain copolymer powder, which was pelletized with a single screw extruder to yield an ethylene-1-hexene copolymer. Results with the evaluation of physical properties of the ethylene-1-hexene copolymer obtained are shown in Table 1.

TABLE 1

| Physical properties of polymer | | Example 1 | Example 2 | Example 3 | Comparative Example 1 | Comparative Example 2 | Comparative Example 3 |
| --- | --- | --- | --- | --- | --- | --- | --- |
| MFR | g/10 min | 0.43 | 0.59 | 0.28 | 0.46 | 1.3 | 2.2 |
| d | kg/m$^3$ | 925.6 | 920.6 | 919.6 | 920.4 | 920.1 | 919.6 |
| Ea | kJ/mol | 68 | 72 | 67 | 73 | 71 | 41 |
| Mw/Mn | — | 11.5 | 13.4 | 16.5 | 8.8 | 7.3 | 3.9 |
| MFRR | — | 130 | 107 | 108 | 131 | 87 | 50 |
| [η] | g/dL | 1.75 | 1.64 | 1.53 | 0.83 | 1.53 | 0.85 |
| Number of minute defects Moldability | number/m$^2$ | 650 | 730 | 890 | >3000 | 3100 | >3000 |
| Resin pressure Film properties | MPa | 29 | 28 | 33 | 29 | 23 | 25 |
| Flicker feeling | | ○ | ○ | ○ | x | x | x |

According to the present invention, an ethylene-α-olefin copolymer with good extrudability and forming a molding with less flickering, a molding of the copolymer and a process for producing the copolymer, can be provided.

The invention claimed is:

1. An ethylene-α-olefin copolymer comprising monomer units derived from ethylene and monomer units of an α-olefin having 3 to 20 carbon atoms and having a melt flow rate of from 0.01 to 100 g/10 min, an activation energy of flow of 50 kJ/mol or more, a molecular weight distribution measured by a gel permeation chromatography of 3 or more and minute defects of 2000/m$^2$ or less in number.

2. The ethylene-α-olefin copolymer according to claim 1, wherein the ethylene-α-olefin copolymer is the one produced by copolymerizing ethylene with an α-olefin having 3 to 20 carbon atoms with a solid catalyst component prepared by supporting a catalyst component on a fine particle-like support.

3. A molding obtained by molding the ethylene-α-olefin copolymer of claim 1 or 2.

4. A process for producing an ethylene-α-olefin copolymer which comprises copolymerizing ethylene with an α-olefin having 3 to 20 carbon atoms in the presence of a prepolymerized solid catalyst, wherein the prepolymerized solid catalyst is prepared by prepolymerizing an olefin in the presence of a contact-treated product prepared by contact-treating a component (A) with a component (B), and then with a component (C), 0.1 to 5 g of prepolymer being produced from the initiation of the prepolymerization per 1 g of the (A) and the prepolymer having an intrinsic viscosity of 2 to 4 dl/g; and a content of the prepolymer in the prepolymerized solid catalyst is 0.5 to 500 g per 1 g of the (A) the prepolymer has an intrinsic viscosity of 1.2 to 2 dl/g; and a heat quantity of crystal fusion of the prepolymer is 160 J/g or more; wherein the component (A) is a solid co-catalyst component prepared by supporting a compound forming an ionic complex by ionization of a metallocene complex on a fine particle-like support; the component (B) is the metallocene complex; and Component (C) is an alkylating agent, wherein the ethylene-α-olefin copolymer has minute defects of $2000/m^2$ or less in number.

* * * * *